US011780308B2

(12) United States Patent
Nilsson et al.

(10) Patent No.: US 11,780,308 B2
(45) Date of Patent: Oct. 10, 2023

(54) VEHICLE WING ELEMENT HEATING SYSTEM

(71) Applicant: Ningbo Geely Automobile Research & Development Co., Ltd., Ningbo (CN)

(72) Inventors: Magnus Nilsson, Floda (SE); Erik Lindberg Nilsson, Gothenburg (SE)

(73) Assignee: NINGBO GEELY AUTOMOBILE RESEARCH & DEVELOPMENT CO, Ningbo (CN)

( * ) Notice: Subject to any disclaimer, the term of this patent is extended or adjusted under 35 U.S.C. 154(b) by 88 days.

(21) Appl. No.: 17/478,263

(22) Filed: Sep. 17, 2021

(65) Prior Publication Data

US 2022/0001732 A1 Jan. 6, 2022

Related U.S. Application Data

(63) Continuation of application No. PCT/CN2020/078163, filed on Mar. 6, 2020.

(30) Foreign Application Priority Data

Mar. 27, 2019 (EP) ..................................... 19165456

(51) Int. Cl.
*E06B 7/22* (2006.01)
*B60J 10/60* (2016.01)
(Continued)

(52) U.S. Cl.
CPC ............... *B60J 10/60* (2016.02); *B60J 10/84* (2016.02); *E05B 85/10* (2013.01)

(58) Field of Classification Search
CPC . B60J 10/60; B60J 10/84; E05B 85/10; E05B 81/01; H05B 1/0236; H05B 2214/02; G05B 3/56
See application file for complete search history.

(56) References Cited

U.S. PATENT DOCUMENTS 4,080,764 A * 3/1978 Stowik .................. F25D 23/085
52/173.1
6,266,925 B1 7/2001 Camerer
(Continued)

FOREIGN PATENT DOCUMENTS

CN 205800750 U 12/2016
CN 206501689 U 9/2017
(Continued)

OTHER PUBLICATIONS

International Search Report from corresponding International Application No. PCT/CN2020/078163, dated May 27, 2020, 2 pages.
(Continued)

*Primary Examiner* — Jerry E Redman
(74) *Attorney, Agent, or Firm* — Tucker Ellis LLP

(57) ABSTRACT

A heating system for a vehicle wing element, wherein the wing element is moveably arranged between an open position and a closed position relative to a vehicle main structure. The heating system includes a heating element at a contact surface between the wing element and the main structure and a control unit for activating the heating element. The system further includes a wing element handle sensor and a wing element latch switch. The switch is operatively connected to the control unit for sending a signal indicative of its state to the control unit. The control unit is arranged to send an activation signal to the heating element when the control unit receives a signal from the wing element handle sensor that the handle is being pulled and a signal from the wing element latch switch that the wing element is closed.

11 Claims, 5 Drawing Sheets

(51) Int. Cl.
*B60J 10/84* (2016.01)
*E05B 85/10* (2014.01)

(56) References Cited

U.S. PATENT DOCUMENTS

| | | | | |
|---|---|---|---|---|
| 10,011,363 | B2* | 7/2018 | Perrier | B64D 15/04 |
| 10,822,842 | B2* | 11/2020 | Salter | G01H 1/12 |
| 11,479,097 | B2* | 10/2022 | Ryu | B60J 10/24 |
| 2010/0096377 | A1 | 4/2010 | Zubrecki | |
| 2013/0312330 | A1* | 11/2013 | Sturgell | B60J 10/75 49/70 |
| 2014/0034633 | A1* | 2/2014 | Heintz | H01C 17/065 219/525 |
| 2017/0107747 | A1* | 4/2017 | Dente | E05B 81/04 |
| 2017/0210282 | A1* | 7/2017 | Rodriguez Barros | G03B 21/00 |
| 2019/0168592 | A1* | 6/2019 | Baskar | B60J 10/40 |
| 2021/0046811 | A1* | 2/2021 | Ryu | B60J 10/18 |

FOREIGN PATENT DOCUMENTS

| | | | | |
|---|---|---|---|---|
| CN | 109515131 | A | 3/2019 | |
| DE | 1216128 | B | 5/1966 | |
| DE | 3136468 | A1 | 3/1983 | |
| DE | 69205726 | T2 | 5/1996 | |
| DE | 19651733 | A1 | 6/1998 | |
| DE | 102015221413 | A1 | 5/2017 | |
| EP | 3716728 | A1 * | 9/2020 | B60J 10/60 |
| GB | 2100025 | A | 12/1982 | |
| JP | 2004027556 | A * | 1/2004 | |
| WO | WO-9901635 | A2 * | 1/1999 | E05B 79/20 |
| WO | WO-2004025061 | A1 * | 3/2004 | E05B 81/64 |

OTHER PUBLICATIONS

Extended European Search Report from corresponding European Application No. 19165456, dated Oct. 10, 2019, 8 pages.

* cited by examiner

VEHICLE WING ELEMENT HEATING SYSTEM

RELATED APPLICATION DATA

This application is a continuation of International Patent Application No. PCT/CN2020/078163, filed Mar. 6, 2020, which claims the benefit of European Patent Application No. 19165456.5, filed Mar. 27, 2019, the disclosures of which are incorporated herein by reference in their entireties.

TECHNICAL FIELD

The present invention relates to a heating system for a vehicle wing element which is moveably arranged between an open position and a closed position in relation to a vehicle main structure. The heating system comprises at least one heating element which is adapted to be arranged at a contact surface between the wing element and the main structure and a control unit operatively connected to the heating element for activation of the heating element.

BACKGROUND

From the serial production of motor vehicles, a plurality of wing elements such as in particular doors or flaps are known which are held movable between a closed position and at least one open position relative to the structure. In order to prevent that moisture between the wing element and the structure passes through and penetrates, for example to the interior of the motor vehicle, usually at least one sealing element is arranged between the wing element and the structure.

At cold ambient temperatures and thus especially in winter the freezing of the wing element on the seal of the vehicle structure sometimes becomes an issue. For example, when the seal element freezes the wing element no longer or only by the application of very high forces be moved from the closed position to the open position. This results in very high loads on the sealing element which obviously can greatly affect the sealing function.

Several solutions exist to overcome the above issues. An example is a system with a heating element that comprises at least one heating wire, by means of which the sealing element is heatable at least partially. This allows the sealing element to be heated and to relatively high temperatures without damaging the sealing element.

The activation of the heating element is made by means of a control device that is effected by the unlocking. The control device thus serves to control or regulate the heating element, so that the heating element automatically, i.e. without active intervention of the user, is activated. As a result, the user can open the wing element particularly easily, without undesirably loading the sealing element.

In order not to activate the heating element when it is not cold or risk of freezing a temperature sensor is used to signal the control unit whether or not there is a risk of the sealing element being frozen. Thus, when the ambient temperature is below freezing point, i.e. below zero degrees centigrade (32 F), the heating element is activated when the vehicle is unlocked.

SUMMARY

It is an object of the present invention to provide an improved heating system for vehicle wing elements/members.

According to a first aspect of the present disclosure a heating system for a vehicle wing element, the wing element is moveably arranged between an open position and a closed position in relation to a vehicle main structure. The heating system comprises at least one heating element which is adapted to be arranged at a contact surface between the wing element and the main structure and a control unit operatively connected to the heating element for activation of the heating element.

The system further comprises a wing element handle sensor which is operatively connected to the control unit for sending a signal indicative of its state to the control unit and a wing element latch switch. The switch is operatively connected to the control unit for sending a signal indicative of its state to the control unit, wherein the control unit is arranged to send an activation signal to the heating element when the control unit receives a signal from the wing element handle sensor that the handle is being pulled and a signal from the wing element latch switch that the wing element is closed.

Thus, the heating is initiated by the handle being pulled together with the wing element not being opened. The wing element not opening upon the handle being pulled indicates that the wing element is frozen to the vehicle main structure.

According to one aspect of the present disclosure the heating element is a heating coil.

According to a further aspect of the present disclosure the heating system comprises a sealing element which is adapted to be arranged at a contact surface between the wing element and the main structure and wherein the heating element is arranged to heat the sealing element.

Most vehicles have sealing elements arranged at the contact surface between the wing elements and the vehicle main structure in order to avoid water/moisture from getting into the vehicle.

The sealing element comprises resilient rubber according to yet a further aspect of the present disclosure.

The heating element of the heating system is according to another aspect of the present disclosure an electrical heating element. Battery power is available in all vehicles and an electrical heating element is relatively easy to install.

In order to avoid the wing element being pulled open too fast, i.e. before the heating element has had time to heat up the frozen parts enough to loosen the wing element from the main structure, the heating system further comprising a brake for the wing element in accordance with a further aspect of the present disclosure. The brake is adapted to engage a predetermined time from the activation of the heating element. For instance, a timer could be set at 2 seconds. Depending on the ambient temperature, the timer could be adjusted such that the colder it is, the longer the time the brake is activated. The time necessary is also of course dependent on the power used to heat, the higher the power the shorter the time.

If for instance the wing element is blocked from opening, e.g. due to an object on the outside the vehicle, it obviously will not help activating the heating system. Thus, according to an alternative aspect of the present disclosure the system further comprises a temperature sensor connected to the control unit. If the temperature is above a predetermined level, for instance freezing point, the heating system will not be activated if the handle is pulled but the wing element remains closed. Generally, all vehicles have a temperature sensor for measuring the ambient temperature. Thus, this sensor could be used for the above purposes by connecting it to the control unit of the heating system.

According to yet a further aspect of the present disclosure a control unit is arranged in each wing element. Each wing element could thus be more or less autonomous.

To further increase the autonomy of the heating system it further comprises a power supply separate from the other sources of power in the vehicle. The power supply could be charged when the vehicle is driven in the case the vehicle has an internal combustion engine and/or charged in case of an electric hybrid or electric vehicle.

A further option is to have a power supply arranged in each wing element that has heating elements.

According to one aspect of the present disclosure a vehicle is provided that comprises a main structure and at least one wing element, the wing element moveably arranged between an open position and a closed position in relation to the vehicle main structure and wherein the vehicle comprises a heating system according to the above disclosure.

According to a second aspect of the vehicle the at least one heating element is arranged around a circumference of the vehicle wing element.

Further, a method for activation of at least one heating element arranged at a contact surface between a vehicle wing element and a vehicle main structure is provided. The wing element is moveably arranged between an open position and a closed position in relation to the vehicle main structure, the method comprises receiving a signal from a wing element handle sensor that the handle is being pulled, receiving a signal from a wing element latch switch that the wing element is closed in direct connection with the signal from the wing element handle sensor, and in response to the received signals from the wing element handle sensor and the wing element latch switch sending an activation signal to the heating element.

Also provided is a computer program product comprising a non-transitory computer readable medium, having thereon a computer program comprising program instructions, the computer program being loadable into a data processing unit and configured to cause execution of the method disclosed above when the computer program is run by the data processing unit.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION

Figure 1:
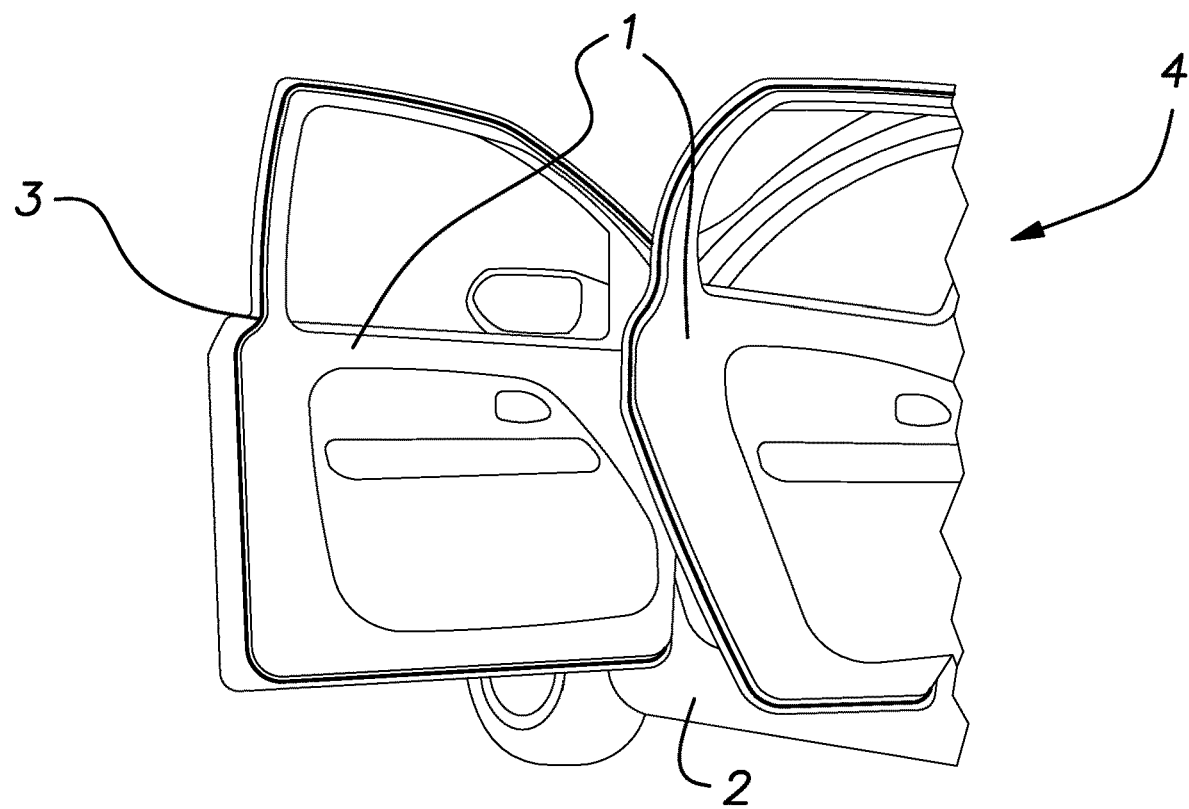
FIG. 1 is a partial perspective view of a side of a vehicle with the doors open.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With reference to FIG. 1, a part of a vehicle 4 is shown with two doors 1 open displaying heating elements 3 arranged around a circumference of the doors 1 arranged where there is a contact surface between the doors 1 and the vehicle main structure 2.

Figure 2:
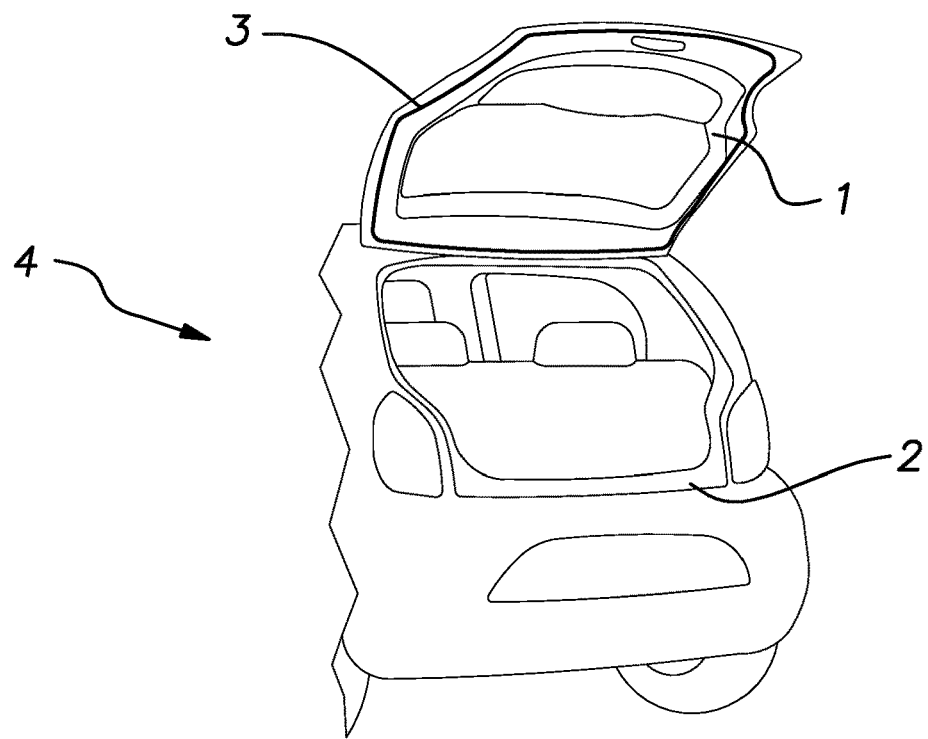
FIG. 2 is partial perspective view of the rear side of a vehicle with the tailgate open.

Turning to FIG. 2, a rear side of a vehicle 4 is shown with the tailgate 1 open displaying heating elements 3 arranged around a circumference of the tailgate arranged where there is a contact surface between the tailgate 1 and the vehicle main structure 2.

Figure 3:
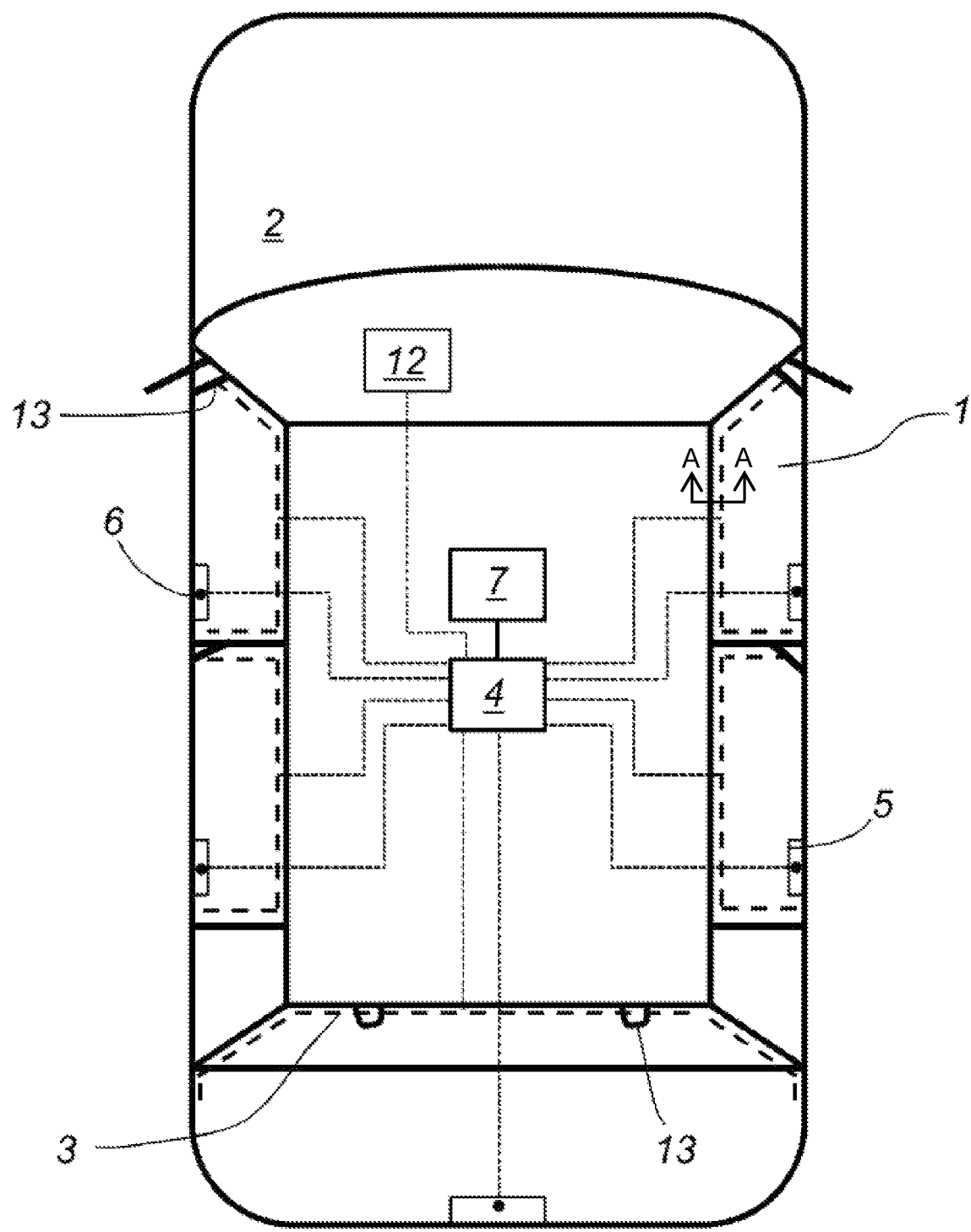
FIG. 3 is a schematic top view of a vehicle.

In FIG. 3 a heating system according to the present disclosure for a vehicle with doors 1 and a tailgate 1 is shown. The doors and tailgate 1 are moveably arranged between an open position and a closed position in relation to the vehicle main structure 2. The heating system comprises one heating element 3 for each door 1 and the tailgate 1 and it is adapted to be arranged at a contact surface between the doors/tailgate 1 and the main structure 2. A control unit 4 is operatively connected to the heating elements 3 for activation of the heating elements 3.

The system further comprises wing element handle sensors 5 which are operatively connected to the control unit 4 for sending a signal indicative of the state for each door to the control unit 4 and wing element latch switches 6. The switches 6 are operatively connected to the control unit 4 for sending a signal indicative of the state for each door to the control unit 4.

The control unit 4 is arranged to send an activation signal to the heating element 3 when the control unit 4 receives a signal from the wing element handle sensor 5 of the same door 1 that the handle is being pulled and a signal from the wing element latch switch 6 of the same door that the door 1 is closed in direct connection with the signal from the wing element handle sensor 5.

The heating elements 3 are electrical heating elements and supplied from a battery 7 that functions as a power supply.

Thus, if a door 1 is frozen to the vehicle main structure 2, when the handle of that door 1 is pulled, the control unit 4 receives a signal from the wing element handle sensor 5 of the same door 1 that the handle is being pulled. The control unit further receives a signal from the wing element latch switch 6 of the same door 1 that the door is closed.

In response to the received signals from the wing element handle sensor 5 and the wing element latch switch 6, the control unit 4 sends an activation signal to the heating element 3 of the door 1 in question.

As an option, the temperature sensor 12 of the vehicle is connected to the control unit 4 in order to stop the activation of the heating elements 3 if the temperature is above freezing point. The temperature being above the freezing point could be indicative of something else blocking the wing element/door 1, i.e. heating would thus not have any effect. Also, the temperature information could also be used to set a timer for a wing element/door brake 13. Brakes 13 are schematically shown in FIG. 3 at the wing elements/doors 1 in combination with the hinges. Thus, if the heating element 3 of a wing element/door is activated, the brake 13 is engaged for a predetermined time depending on the ambient temperature and/or the power supply.

Figure 4:
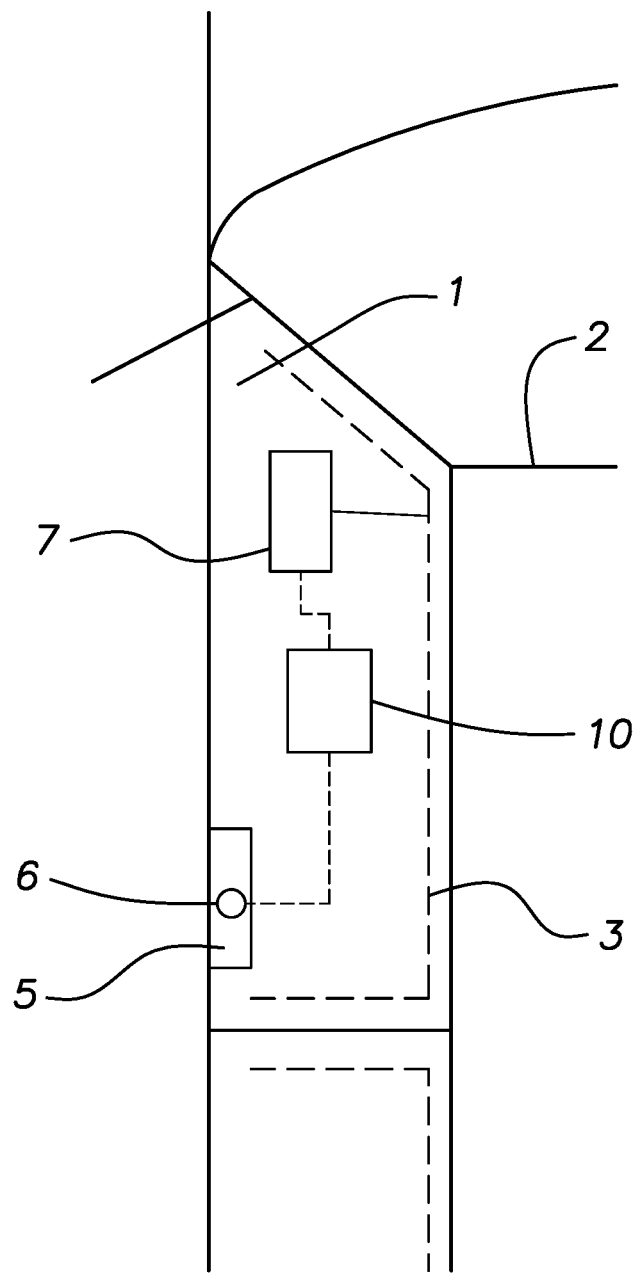
FIG. 4 is a partial schematic top view of a vehicle showing an alternative embodiment of the present disclosure.

FIG. 4 shows an alternative embodiment where a control unit 10 is arranged in the wing element/door 1. Further, a power supply 7 is arranged in the door 1 as well. The control unit thus receives a signal that the handle is being pulled but the door 1 is still closed and power is as a result transferred from the power supply 7 to the heating element 3.

Figure 5:
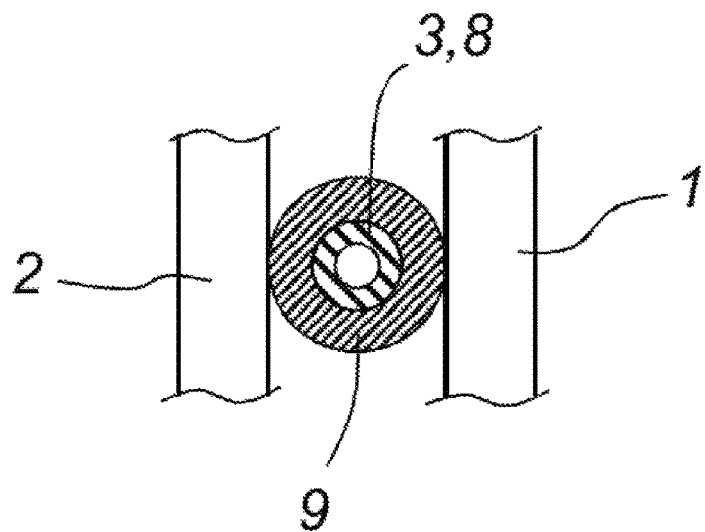
FIG. 5 is a schematic partial cross section taken along the line A-A in FIG. 3 of an embodiment of a wing element, sealing element, heating element and the main structure according to the present disclosure.

In FIG. 5 a sealing element 9 is shown arranged at the contact surface between the wing element 1 and the main structure 2. The heating element 3 is a heating coil 8.

Figure 6:
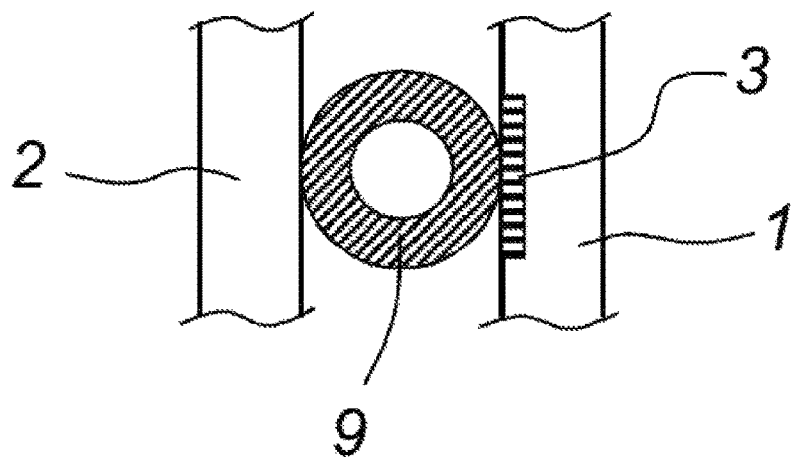
FIG. 6 is a schematic partial cross section taken along the line A-A in FIG. 3 of another embodiment of a wing element, sealing element, heating element and the main structure according to the present disclosure.

In FIG. 6 a sealing element is shown arranged at the contact surface between the wing element 1 and the main structure 2. The heating element 3 is arranged in the wing element 1.

Figure 7:
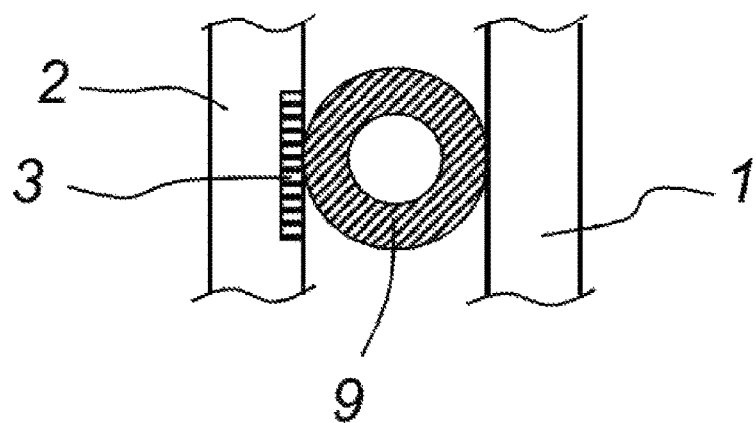
FIG. 7 is a schematic partial cross section taken along the line A-A in FIG. 3 of a further embodiment of a wing element, sealing element, heating element and the main structure according to the present disclosure.

In FIG. 7 a sealing element is shown arranged at the contact surface between the wing element 1 and the main structure 2. The heating element 3 is arranged in the main structure 2.

Figure 8:
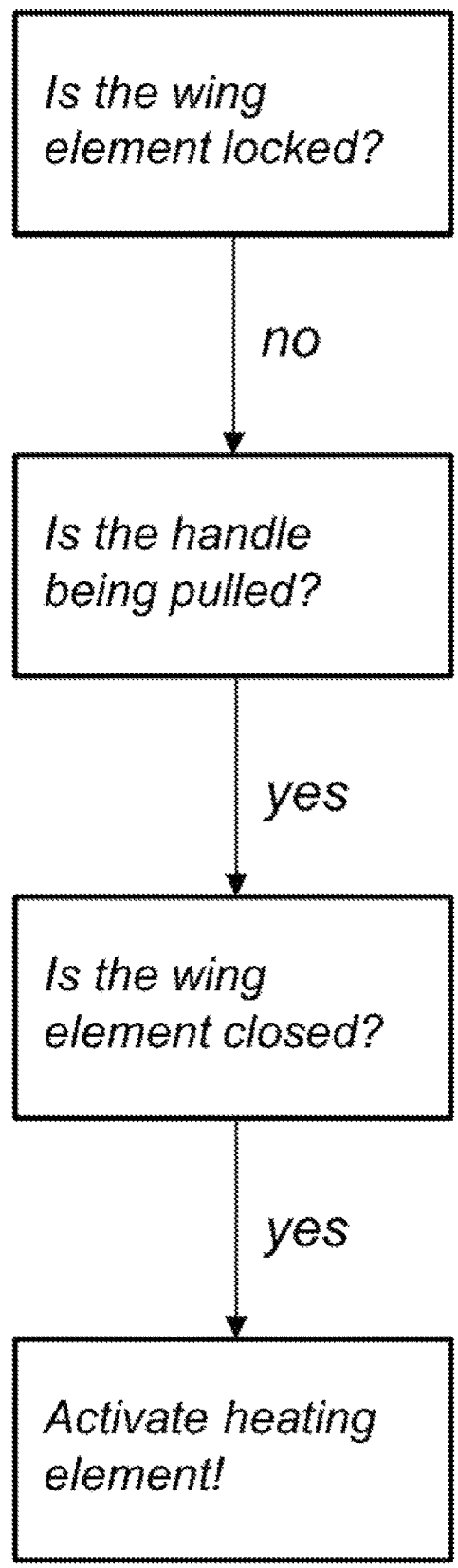
FIG. 8 is a flow chart of the method according to the present disclosure.

FIG. 8 depicts the method of the present disclosure. When the wing element is locked the system is not active. Upon unlocking the wing element or the vehicle the system of the present disclosure goes into standby mode. When a handle is pulled and the corresponding wing element 1 remains closed, the heat element 3 is activated.

It is to be understood that the present invention is not limited to the embodiments described above and illustrated in the drawings; rather, the skilled person will recognize that many changes and modifications may be made within the scope of the appended claims. For example, the heating elements could be arranged on the vehicle main structure 2 instead of on the vehicle wing elements 1.

What is claimed is:

1. A heating system for a vehicle wing element, the wing element being moveably arranged between an open position and a closed position in relation to a vehicle main structure, wherein the heating system comprises:
    a heating element arranged at a contact surface between the wing element and the main structure;
    a control unit operatively connected to activate the heating element;
    a wing element handle sensor operatively connected to the control unit and that sends a signal indicative that a handle of the wing element has been pulled to the control unit; and
    a wing element latch switch operatively connected to the control unit and that sends a signal indicative of an open or closed state of the wing element to the control unit,
    wherein the control unit activates the heating element upon the control unit receiving both the signal indicative that the handle of the wing element has been pulled and the signal indicative of the open or closed state of the wing element from the wing element latch switch specifying that the wing element is closed.

2. The heating system according to claim 1, wherein the heating element is a heating coil.

3. The heating system according to claim 1, wherein the heating system comprises a sealing element arranged at a contact surface between the wing element and the vehicle main structure, and wherein the heating element heats the sealing element.

4. The heating system according to claim 3, wherein the sealing element comprises resilient rubber.

5. The heating system according to claim 1, wherein the heating element is an electrical heating element.

6. The heating system according to claim 1, wherein a temperature sensor is connected to the control unit.

7. The heating system according to claim 1, wherein the control unit is arranged in the wing element.

8. The heating system according to claim 1, further comprising a power supply.

9. The heating system according to claim 8, wherein the power supply is arranged in the wing element.

10. A vehicle comprising the vehicle main structure, the wing element, and the heating system according to claim 1.

11. The vehicle according to claim 10, wherein the heating element is arranged around a circumference of the vehicle wing element.

* * * * *